(12) United States Patent
Marcichow et al.

(10) Patent No.: US 7,325,566 B2
(45) Date of Patent: Feb. 5, 2008

(54) FILTERING SEAL FOR A FLUID CONTROL VALVE

(75) Inventors: Martin E. Marcichow, Hoffman Estates, IL (US); Jonathan W. Snyder, Wheaton, IL (US)

(73) Assignee: Sloan Valve Company, Franklin Park, IL (US)

( * ) Notice: Subject to any disclaimer, the term of this patent is extended or adjusted under 35 U.S.C. 154(b) by 258 days.

(21) Appl. No.: 10/775,294

(22) Filed: Feb. 10, 2004

(65) Prior Publication Data

US 2005/0173006 A1 Aug. 11, 2005

(51) Int. Cl.
*B01D 29/00* (2006.01)
(52) U.S. Cl. .................. 137/549; 210/457; 210/497.01
(58) Field of Classification Search ................ 137/549, 137/550; 210/457, 489, 497.01, 499
See application file for complete search history.

(56) References Cited

U.S. PATENT DOCUMENTS

| 844,776 | A | * | 2/1907 | Carlson ................ 137/549 |
| 3,200,952 | A | * | 8/1965 | Jardin ................ 210/497.1 |
| 3,363,763 | A | * | 1/1968 | Erickson ................ 210/432 |
| 3,400,821 | A | * | 9/1968 | Singleton ................ 210/457 |
| 4,478,617 | A | * | 10/1984 | Rees ................ 137/549 |
| 4,609,459 | A | * | 9/1986 | Hendrix ................ 210/497.01 |
| 4,951,878 | A | | 8/1990 | Casey et al. |
| 5,213,303 | A | | 5/1993 | Walker |
| 5,238,192 | A | | 8/1993 | McNair |
| 5,406,974 | A | * | 4/1995 | Griswold ................ 137/549 |
| 5,482,622 | A | | 1/1996 | Stark et al. |
| 5,591,339 | A | | 1/1997 | Robinson |
| 5,766,471 | A | | 6/1998 | Sumiyoshi |
| 5,772,123 | A | | 6/1998 | Augustin et al. |
| 5,807,483 | A | | 9/1998 | Cassidy et al. |
| 6,405,752 | B1 | | 6/2002 | Fritsch et al. |
| 6,454,240 | B1 | | 9/2002 | Moreno et al. |
| 6,517,718 | B2 | | 2/2003 | Gutierrez et al. |
| 2002/0020452 | A1 | | 2/2002 | Barger |
| 2002/0100890 | A1 | | 8/2002 | Moreno et al. |
| 2002/0155008 | A1 | | 10/2002 | Hauser et al. |

* cited by examiner

*Primary Examiner*—John Rivell
(74) *Attorney, Agent, or Firm*—Cook, Alex, McFarron, Manzo, Cummings & Mehler, Ltd.

(57) ABSTRACT

A filtering seal for a solenoid valve has an annular base member which defines an axial first retainer surface and a radial sealing surface. Legs extend from the base member. An annular screen support member is attached to the legs and has an axial second retainer surface. The first and second retainer surfaces are on outside diameters of the base member and screen support member. A cylindrical filter screen has one end mounted on the base member and the other end mounted on the screen support member, in engagement with the retainer surfaces. The base member may have bosses protruding from an end face to form a rotary seal suitable for engagement with a swivel connector. The radial sealing surface of the base member is located outwardly of the filter screen where the radial sealing surface can be compressed without affecting the filter screen.

17 Claims, 4 Drawing Sheets

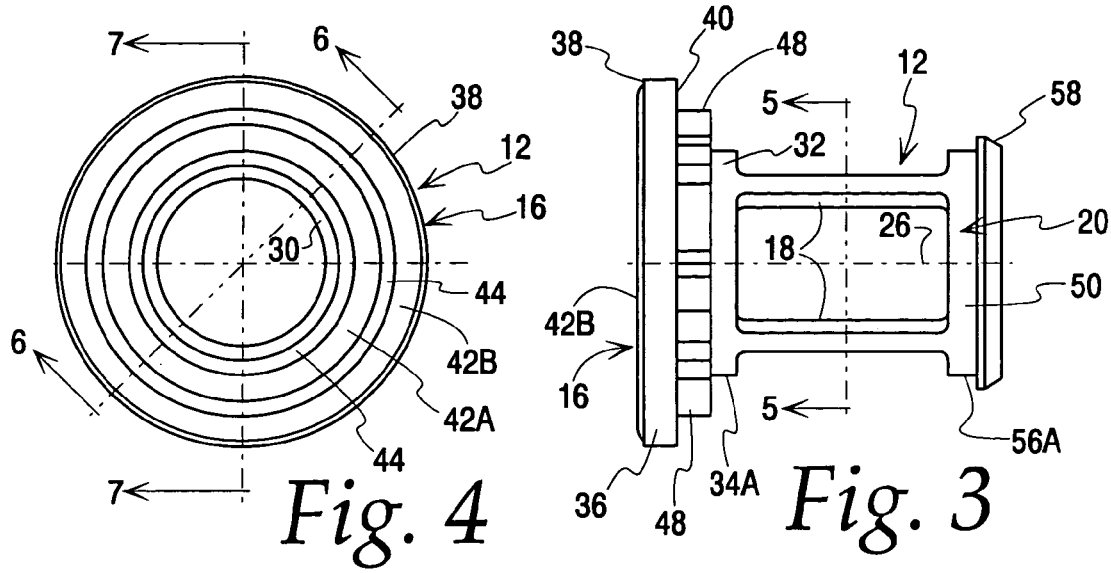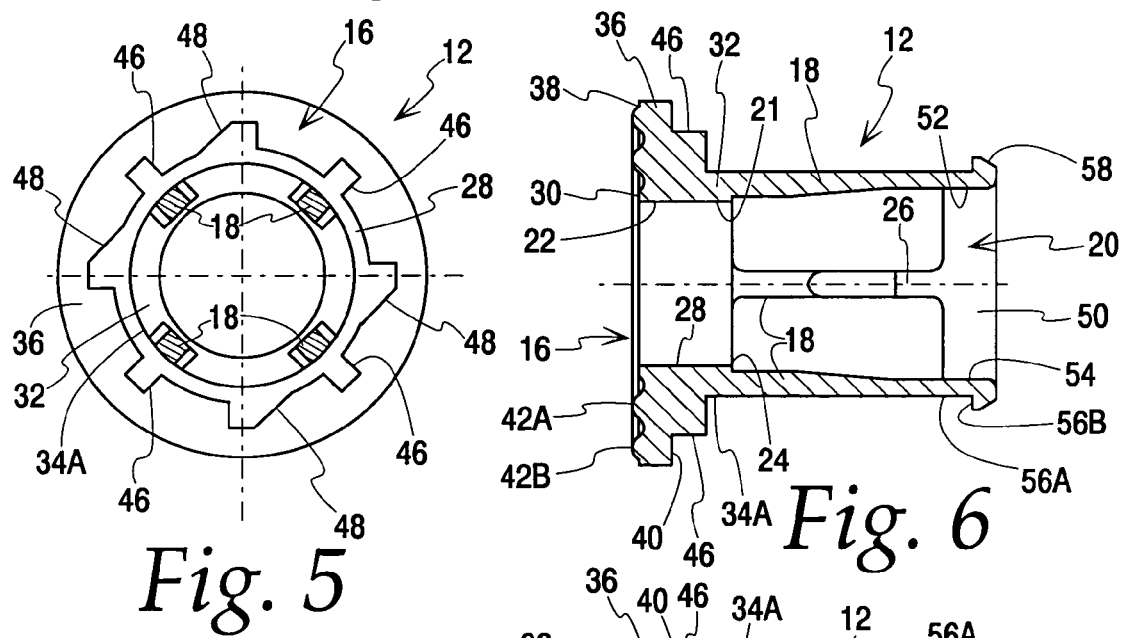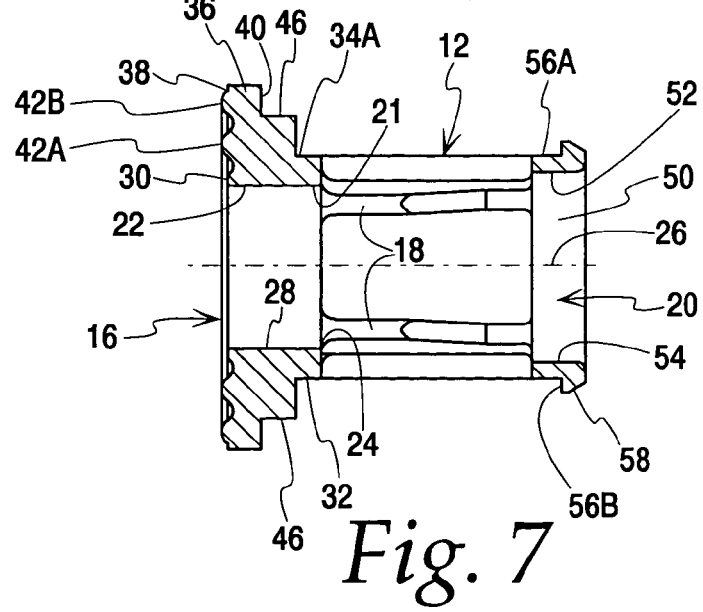

FILTERING SEAL FOR A FLUID CONTROL VALVE

BACKGROUND OF THE INVENTION

This invention relates to filters and seals used in solenoid valves. Such valves are commonly used in commercial, institutional and public washrooms where sensor-controlled fixtures such as faucets, showerheads and the like are provided. A sensor associated with a fixture senses the presence or departure of a user and sends an appropriate electrical signal to one or more solenoid valves in the water supply lines to open or close, thereby starting and stopping water flow as needed. Some solenoid valves use a control bypass which utilizes the water pressure to assist in closing the valve. All solenoid valves have a valve seat and some type of closure member which opens or closes the valve seat to start and stop flow. The control bypass and the valve seat must be kept clear of particles or debris to prevent clogging. Particles deposited on these sensitive areas can cause the valve to leak, or even worse, they can prevent the valve from opening or closing. Filters are used to prevent particles from clogging of the control bypass or from being deposited on the seat. A typical filter includes a cylindrical screen placed in or near the inlet to the valve.

However, filters have problems of their own. Particular attention must be paid to sealing the ends of the filter to prevent particles from bypassing the filter altogether. In the past, two approaches to this problem have been used. The first approach is to physically compress the filter screen on its ends by tightening a cap or the like. This makes the screen usable one time only. That is, when the valve is opened for maintenance the screen that has been deformed cannot subsequently be compressed the way it was when it was new. Replacing this type of filter in the field is very difficult because of the torque required to compress the filter and make a seal with the valve cap.

The second approach found in the prior art is to put a rubber seal on each end of the filter. But there is no good way to attach a rubber seal to what is usually a metal mesh filter screen. Experience shows that the rubber seals tend to fall off if the filter is removed during maintenance. Attempts to mold seals on the ends of a screen are restricted by the geometry of the part. A cylindrical filter screen cannot have seals molded on to its ends. In addition, molding a seal on to a screen can not be easily controlled. During the molding cycle the rubber tends to flash into what is intended to be the open area of the screen, thus reducing the available filter area. Seals formed separately from the filter screen can be placed on the ends of the filter screens in the factory, but there is no good way to retain them in the desired position in the field. Gluing individual rubber seals to the ends of the filter screen has been tried without success. They come off the filter screen in the field. Installers would either not notice this or incorrectly install the rubber seals. Eventually particles would bypass the filter and cause the valve to malfunction as mentioned above. What is needed is a seal for a filter that will not come apart in the field.

SUMMARY OF THE INVENTION

This invention concerns a filtering seal for use in a solenoid valve. A primary object of the invention is a filtering seal that seals the ends of a filter screen and seals to the valve body.

Another object of the invention is a seal of the type described that will not come apart if the valve is disassembled and will provide either a static or rotary seal at the end of the filter assembly.

A further object of the invention is a filtering seal that will retain the sealing elements in place on a filter screen without the use of adhesives or molding of the sealing elements to the screen.

Yet another object of the invention is a seal that can seal in both the radial and axial directions of the valve body and/or service cap.

Still another object is a filtering seal that can incorporate a rotary seal if desired without the need for additional components to support the rotary seal.

The above objects are met by a filtering seal having a holder including a base member and a screen support member. The base member and screen support member are joined by a plurality of legs. The base member has an axial first retainer surface and a radial seal surface. The screen support member has an axial second retainer surface and a body sealing surface. A cylindrical filter screen has its ends mounted on the first and second retainer surfaces. Bosses on the end face of the base member may be provided to form a rotary seal with a swivel connector.

The above and other objects of the invention, including combinations of features thereof, will become apparent from the following description. It will be understood, however, that a device could still appropriate the claimed invention without accomplishing each and every one of these desired benefits, including those gleaned from the following description. The appended claims, not these desired benefits, define the subject matter of the invention.

BRIEF DESCRIPTION OF THE DRAWINGS

FIG. 3 is a side elevation view of the screen holder.

FIG. 4 is an end elevation view of the holder, looking at the left end as seen in FIG. 3.

FIG. 5 is a section taken along line 5-5 of FIG. 3.

FIG. 6 is a section taken along line 6-6 of FIG. 4.

FIG. 7 is a section taken along line 7-7 of FIG. 4.

DETAILED DESCRIPTION OF THE INVENTION

Figure 1:
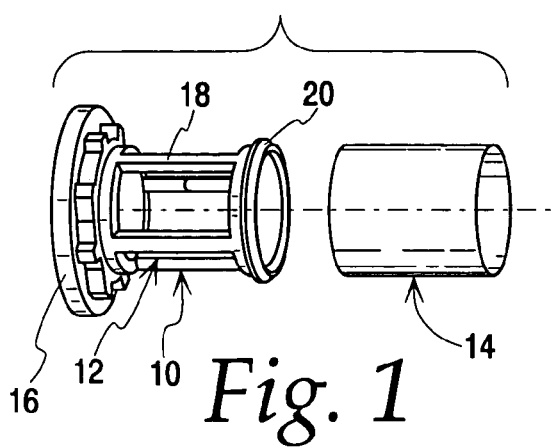
FIG. 1 is an exploded perspective view of a first embodiment of the filtering seal of the present invention.
Figure 2:
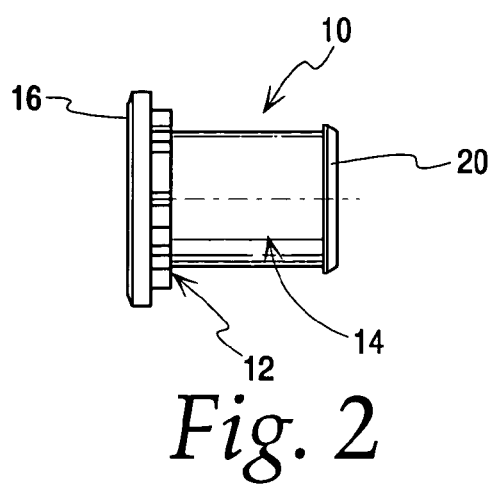
FIG. 2 is a side elevation view of the filtering seal assembly.
Figure 9:
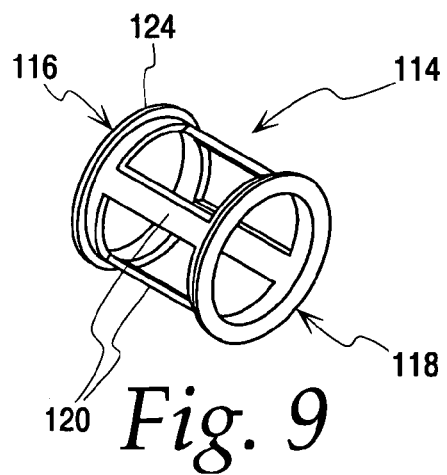
FIG. 9 is a perspective view of a seal holder of an alternate embodiment of the filtering seal.
Figure 11:
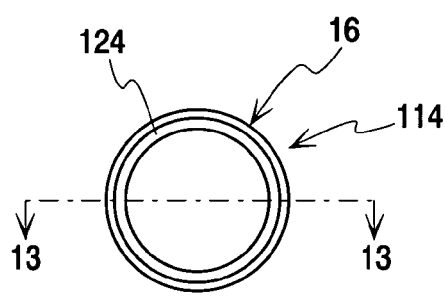
FIG. 11 is a top plan view of the seal holder.
Figure 12:
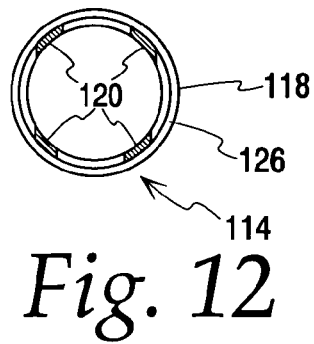
FIG. 12 is section taken along line 12-12 of FIG. 10.
Figure 10:
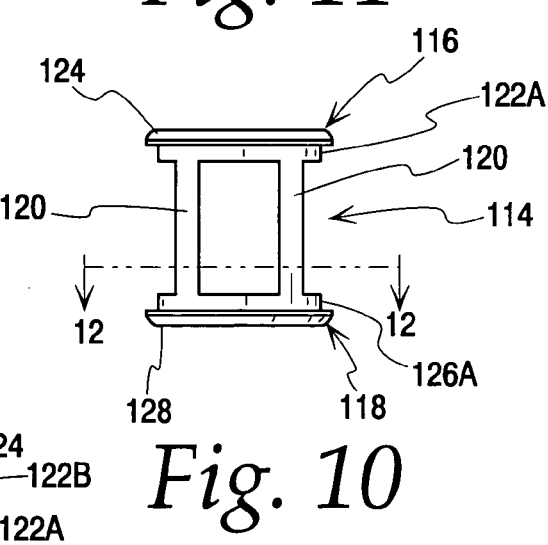
FIG. 10 is a side elevation view of the seal holder of FIG. 9.
Figure 13:
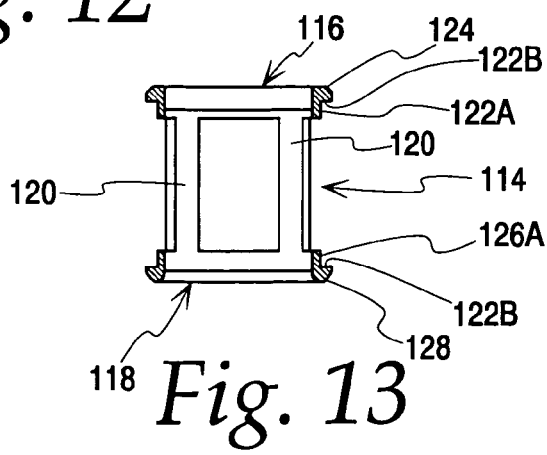
FIG. 13 is a section taken along line 13-13 of FIG. 11.

FIGS. 1 and 2 illustrate generally a first embodiment of the filtering seal 10 of the present invention. There are two main components, a holder 12 and a screen 14. The screen in this embodiment is cylindrical. By way of example only, the screen may be made of 80 mesh stainless steel wire of 0.0055 inch diameter. The holder 12 has three main parts, a base member 16, a plurality of legs 18, and a screen support member 20. These parts are preferably molded as an integral unit from a suitable material such as EPDM having a Shore A durometer of about 65 to 75. It will be understood that other materials could be used.

FIGS. 3-7 illustrate the details of the holder 12. The base member 16 is a generally annular member which has a central bore 21. The bore defines an inlet 22, an outlet 24 and a longitudinal axis 26. The base member has a central hub 28. The hub defines a radial end face 30 adjacent the inlet 22. On the side of the hub opposite the end face there is a holder flange 32 extending axially from the hub. The outside diameter of the holder flange 32 defines an axial first retainer surface 34A. A radial planar surface 34B is formed on the central hub 28 and is adjacent to the first retainer surface 34A. A sealing flange 36 extends radially from the hub. The sealing flange has an end face 38 that is coplanar with the end face 30 of the hub. On the side of the sealing flange opposite its end face there is a radial sealing surface 40.

End face 30 carries an axially-projecting boss 42A and end face 38 has a similar boss 42B. Concave depressions 44 lie adjacent the bosses. The bosses form a dynamic or rotary seal with a swivel connector as will be more fully explained below. Completing the base member is a set of locator members. These members project radially from the hub. There are two types of locator members, straight locators 46 and angled locators 48. As seen in FIG. 5, the two types of locators are interleaved with one another at 45° intervals. The outermost radial portions of the locators all have the same outside diameter which is chosen to match the inside diameter of the valve inlet opening. Accordingly, the locators are used to fit snugly into the inside diameter of the valve body inlet opening and center the holder therein.

The screen support member 20 includes an annular ring 50 having a central bore 52. The bore 52 is coaxial with bore 21 of the base member, both bores being centered on axis 26. The inside wall of the ring defines a body sealing surface 54 while the outside of the wall of the ring defines an axial second retainer surface 56A. The diameter of the second retainer surface is the same as that of the first retainer surface 34A. The extent of the second retainer surface is limited by a bead 58 formed on the end of the ring 50. A radial surface 56B is formed by bead 58 and is adjacent to retainer surface 56A.

As mentioned above, the base member 16 is attached to the screen support member 20 by a plurality of legs 18. In the embodiment shown there are four such legs equally spaced 90° apart, although a different number of legs or different spacing could be used. The legs are arranged such that their outer surfaces are curved and are located on the same diameter as both the first and second retainer surfaces 34A and 56A. Thus, the legs are aligned with the retainer surfaces as seen in FIGS. 5 and 6. The legs have a suitable draft angle toward the screen support member to facilitate molding of the holder.

As seen in FIG. 2, the screen 14 fits snugly over the holder 12 such that the ends of the screen are supported on the first and second retainer surfaces 34A and 56A. Radial surfaces 34B and 56B also fit snugly in the axial direction. The retainer surfaces and radial surfaces seal the ends of the screen and prevent particles or debris from bypassing the ends of the screen. The hub 28 and the bead 58 prevent any axial shifting of the screen on the holder, as the screen is sized to fit snugly between these parts. By snugly, it is meant that there may be a gap due to tolerances but this gap is no more than approximately the size of the apertures in the filter screen. Furthermore, this gap disappears when the holder is compressed during assembly of the filter in a valve.

Figure 8:
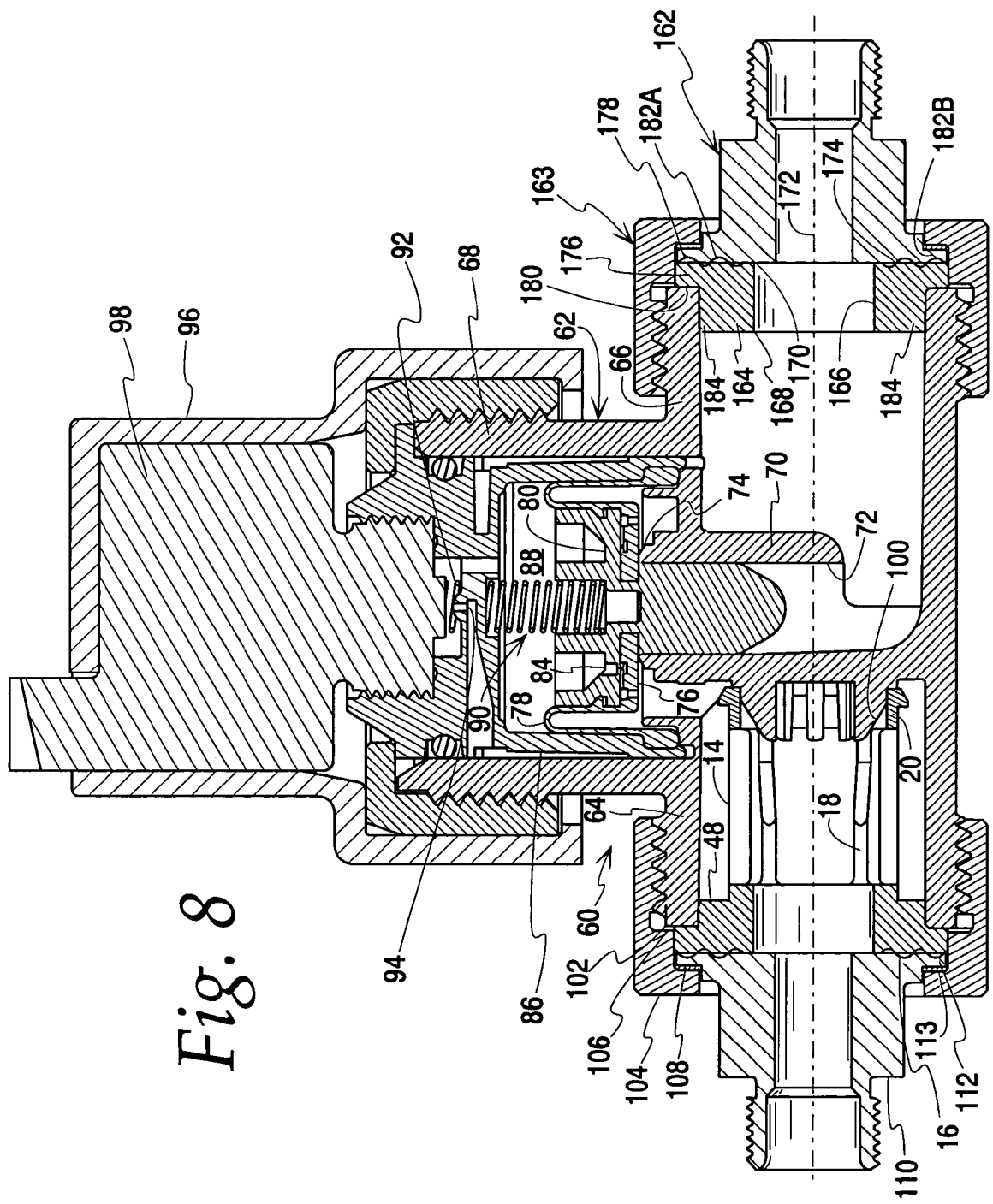
FIG. 8 is a section through a solenoid valve, showing the filtering seal installed in the flow path of the valve.

FIG. 8 shows the filtering seal 10 mounted in one type of a solenoid valve 60. The solenoid valve includes a valve body 62 which has a fluid flow path therein. The body 60 includes an inlet 64, an outlet 66 and an upstanding tee 68. The inlet and outlet are separated by a partition 70 that defines a main passage 72 and a valve seat 74 at the entrance to the passage. The valve seat cooperates with a valve member 76 to open and close the valve. The valve member includes a flexible diaphragm 78 and an orifice plate 80. The orifice plate includes a cross-shaped guide member 82 that slidably extends into the main passage 72 to center the valve member. A control bypass 84 extends through the diaphragm and orifice plate. The outer edges of the diaphragm are clamped to the main body 62 by the lower edges of a diaphragm chamber housing 86. The diaphragm chamber housing defines a pressure chamber 88 above the valve member 76. A spring 90 biases the valve member toward the seat 74. A pilot valve 92 normally closes a passage 94 in the diaphragm chamber housing 86 to maintain pressure in the chamber 88. A solenoid 98 is attached to the diaphragm chamber housing 86. A protective cap 96 is used to prevent removal of the solenoid. When activated the solenoid 98 pulls the pilot valve 92 off of the passage 94 to vent the pressure in chamber 88 above the valve member 76. This allows the valve member 76 to lift off the seat 74 and permit flow into the passage 72 and from there to the outlet 66. When the solenoid is deactivated, the pilot valve 92 recloses on passage 94, pressure is reestablished in the chamber 88 and the valve member 76 closes on the seat 74 to stop flow through the valve.

Further details of the solenoid valve 60 include the boss 100 on the side of the partition 70. The body sealing surface 54 of the screen support member 20 is in sealing engagement with the boss 100. The valve body inlet 64 has an end face 102. The locators 46 and 48 fit just inside the end face 102 and against the inside wall of the inlet 64. There are external threads on the valve body inlet for engagement with a retaining nut 104. The nut has first and second shoulders 106 and 108. A swivel connector 110 has a flange 112 at its interior end. There is a slip washer 113 between the shoulder 108 and the flange 112. The retaining nut's second shoulder 108 engages washer 113 which in turn contacts the swivel connector's flange 112 to clamp the connector 110 up against the end face of the filtering seal 10. However, the first shoulder 106 does not contact the valve body's end face 102. The distance between shoulder 106 and the end face 102 limits the amount of compression on the sealing flange 36. The retaining nut 104 is torqued to a designated value chosen to place the desired amount of compression on the radial sealing surface 40 against the end face 102. That compression is such that the end face 102 is sealed but the flange 112 is permitted to rotate against the bosses 42A, 42B while providing a rotary or dynamic seal between these parts. There is axial compression of legs 18 so that the ends of the screen 14 firmly engage radial surfaces 34B and 56B. The axial load applied by tightening the retaining nut closes any gap that may be present in an axial direction and also in the radial.

Water flowing through the swivel connector 110 cannot leak between the connector and the end faces 30, 38 of the filtering seal because of the bosses 42A, 42B. Water flows through the bore 21 of the base member and into the interior of the filter screen 14. It flows outwardly between the legs 18 but cannot bypass the ends of the screen because of the seal between the ends of the screen and the first and second retainer surfaces 34A and 56A, as well as the seal between the ends of the screen and the first and second radial surfaces 34B and 56B. Similarly, water cannot flow between the screen support member 20 and the partition 70 due to the seal provided by the body sealing surface 54 and the boss 100. The only way out is through the filter screen 14, which traps particles and debris and prevents them from reaching either the control bypass 84 or the valve seat 74.

It can be seen that the one-piece holder 12 makes servicing the filtering seal straightforward. The retaining nut 104 is removed and the filtering seal 10 is simply pulled out of the inlet 64. There are no separate seals to fall off or get left behind. The filtering seal can be cleaned and reinserted into the inlet without difficulty.

An alternate embodiment of the invention is shown in FIGS. 9-13. This embodiment uses the same or similar screen as in the first embodiment but has an alternate form of holder 114 which does not include a rotary seal. This filtering seal is suitable for use where it is not in contact with external fitting or connectors. As in the previous embodiment, the holder 114 has a base member 116, a screen support member 118 and four legs 120 joining the base member and screen support member. The base member has an annular hub with an axial first retainer surface 122A on its outer diameter. A sealing flange 124 is formed on the end of the hub. A radial sealing surface 122B is formed on the flange 124 adjacent to the first retainer surface 122A. The screen support member 118 similarly includes an axial second retainer surface 126A and a sealing flange 128. A radial surface 126B is formed on flange 128 and is adjacent to second retainer surface 126A. The screen support member 118 is substantially the same as the base member 116 except for drafts provided to facilitate molding. The outer surfaces of the legs 120 are aligned with the first and second retainer surfaces, the same as in the previous embodiment. The screen fits around the exterior of the holder, surrounding the legs 120 with the ends of the screen engaging the first and second retainer surfaces 122A and 126A. The screen fits snugly in engagement with the radial surfaces 122B and 126B.

Figure 14:
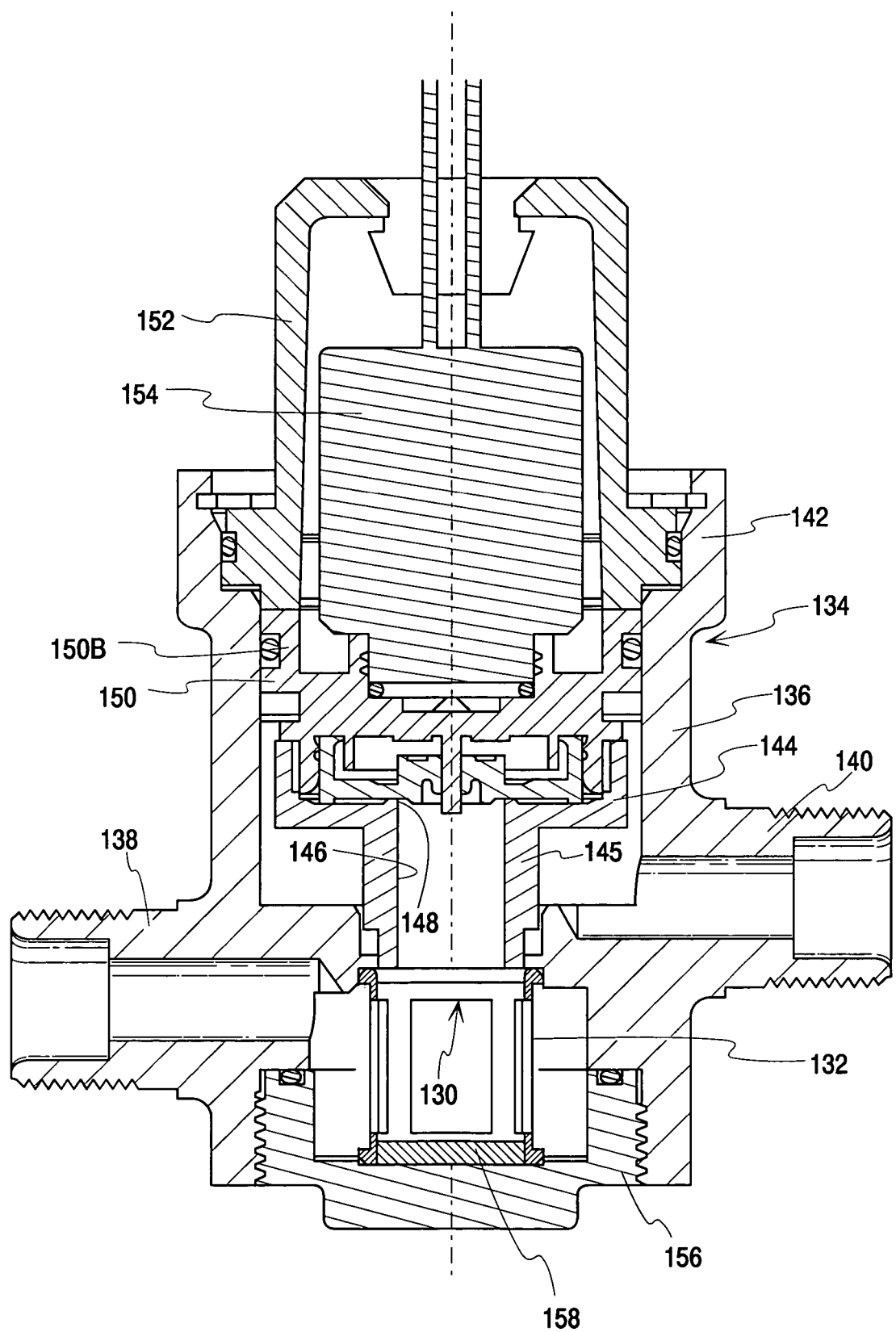
FIG. 14 is a section through an alternate solenoid valve, showing the filtering seal of FIGS. 9-13 installed in the flow path of the valve.

FIG. 14 illustrates a complete filter assembly 130, including holder 114 and screen 132, installed in an alternate form of a solenoid valve 134. Valve 134 includes a valve body 136 which has a fluid flow path therein. The body 136 includes an inlet 138, an outlet 140 and an upstanding portion 142 with appropriate flow passages in each. The inlet and outlet are separated by a fitting 144. The fitting includes a tube 145 whose lower end is sealed to the valve body. The tube 145 defines a main passage 146 and a valve seat 148 at the top of the tube. The valve seat cooperates with a valve member in the form of a flexible diaphragm 150 to open and close the valve. A solenoid body 150B is inserted into the body portion 142 and mounts a solenoid 154. Solenoid housing 152 helps retain solenoid body 150B. When activated the solenoid 154 allows the valve diaphragm 150 to lift off the seat 148 and permit flow out of the passage 146 and to the outlet 140. When the solenoid is deactivated, the valve diaphragm 150 closes on the seat 148 to stop flow through the valve.

The inlet flow passage is defined in part by a cap 156 threaded into the bottom of the valve body. The interior of the cap has a boss 158. The screen support member 118 engages the boss to seal the bottom of the filter assembly 130 to the cap. The base member 116 surrounds the lower end of the tube 145 in sealing engagement. Water flowing to the filter holder from the inlet 138 cannot bypass the screen 132 due to the sealing engagement of the ends of the screen with the first and second retainer surfaces 122A, 126A. Further, water cannot bypass the base member 116 or the screen support member 118 due to the engagement of these elements with the tube 145 and boss 158, respectively. The only available flow path is through the screen, which will trap debris and prevent it from reaching the valve seat. It will be noted that the flow path in this embodiment is from the exterior of the filter assembly to its interior, whereas in the previous embodiment water flows first to the interior of the filter and out to its exterior. Either arrangement is acceptable.

It will be noted that in both embodiments there is axial compression of the filter assembly. This provides several benefits. First, it causes the radial surfaces adjacent the ends of the filter screen to engage the screen and prevent leaks around the ends of the screen. Second, it causes a slight bowing out of the legs and axial retainer surfaces, which further enhances the seal between the holder and the screen. Third, it enhances the sealing capacity of the holder components with the valve body. For example, the sealing surface 54 of the screen support member 20 seals against the boss 100 and the radial end face of the bead 58 also seals against the boss. Thus, there is both axial and radial loading at the screen support member. In the embodiment of FIGS. 9-13 there is axial loading and radial loading at both the base member 116 and the screen support member 118.

FIG. 8 illustrates yet another variation of the present invention. A non-filtering rotary seal 160 is mounted in the outlet 66 of the valve body 62. Since this location is downstream of the control bypass 84 and valve seat 74, there is no need for filtering. But a swivel connector 162 similar to connector 110 is desirable. It is held in place by a retaining nut 163 which may be the same as retaining nut 104. The rotary seal 160 provides the dynamic seal needed but without the filter components. Essentially the rotary seal 160 is the same as the base member 16 but without the holder flange, legs or screen support member. Thus, the rotary seal 160 has a generally annular base member 164 which has a central bore 166 therethrough. The bore defines an inlet 168, an outlet 170 and a longitudinal axis 172. The base member has a central hub. The hub defines a radial end face 174 adjacent the outlet 170. A sealing flange 176 extends radially from the hub. The sealing flange has an end face 178 that is coplanar with the end face 174 of the hub. On the side of the sealing flange 176 opposite its end face there is a radial sealing surface 180. End face 174 carries a projecting boss 182A while end face 178 has a similar boss 182B. The bosses form a dynamic or rotary seal with the swivel connector 162. Locator members 184, similar to locators 46, 48 are formed on the hub. The locators are used to fit snugly into the inside diameter of the valve body outlet opening and center the rotary seal 160 therein. The shoulders of the retaining nut 163 compress the radial sealing surface 180 into engagement with the end of the outlet 170 to prevent leakage at that point. The bosses 182A, 182B prevent leakage between the seal 160 and the swivel connector 162. There may be a slip washer similar to slip washer 113 between the shoulder of the swivel connector 162 and the flange of the retaining nut 163.

While the preferred form of the invention has been shown and described herein, it should be realized that there may be many modifications, substitutions and alterations thereto.

We claim:

1. In a fluid flow control device of the type having a body, a fluid flow path defined in the body including an inlet, an outlet, and a valve seat between the inlet and outlet, and a valve member selectably movable in and out of engagement with the valve seat, the improvement comprising a filtering seal disposable in the fluid flow path upstream of the valve seat, the filtering seal comprising:

a base member which defines an inlet in fluid communication with the flow path's inlet, an outlet in fluid communication with the valve seat, and an axis between the base member's inlet and outlet; said base member including a radially-extending sealing flange, with the radial sealing surface being defined on the sealing flange; said base member defining at its inlet a radial end face and the sealing flange has an end face which is coplanar with the end face of the base member;

a first boss protruding from the end face of the base member and a second boss protruding from the end face of the sealing flange;

an axial retainer surface formed on the base member;

a radial sealing surface formed on the base member and being engageable with the inlet of the control device body; and a screen mounted on the base member in engagement with the retainer surface, the radial sealing surface being radially spaced from the screen a sufficient distance such that compression of the radial sealing surface will not compress the screen.

2. In a fluid flow control device of the type having a body, a fluid flow path defined in the body including an inlet, an outlet, and a valve seat between the inlet and outlet, and a valve member selectably movable in and out of engagement with the valve seat, the improvement comprising a filtering seal disposable in the fluid flow path upstream of the valve seat, the filtering seal comprising:

a base member which defines an inlet in fluid communication with the flow path's inlet, an outlet in fluid communication with the valve seat, and an axis between the base member's inlet and outlet;

an axial retainer surface formed on the base member;

a radial sealing surface formed on the base member and being engageable with the inlet of the control device body;

a screen mounted on the base member in engagement with the retainer surface, the radial sealing surface being radially spaced from the screen a sufficient distance such that compression of the radial sealing surface will not compress the screen;

a plurality of legs attached to the base member and extending therefrom;

a screen support member attached to the legs; said screen support member comprising of an axial retainer surface in engagement with the screen, a body sealing surface engageable with the control device body and a bead having a radial surface adjacent an end of the screen; and said body sealing surface being arranged axially on the screen support member.

3. In a fluid flow control device of the type having a body, a fluid flow path defined in the body including an inlet, an outlet, and a valve seat between the inlet and outlet, and a valve member selectably movable in and out of engagement with the valve seat, the improvement comprising a filtering seal disposable in the fluid flow path upstream of the valve seat, the filtering seal comprising:

a base member which defines an inlet in fluid communication with the flow path's inlet, an outlet in fluid communication with the valve seat, and an axis between the base member's inlet and outlet; said base member having an annular shape;

an axial retainer surface formed on the base member; said axial retainer surface being formed on an outside diameter of the base member a radial sealing surface formed on the base member and being engageable with the inlet of the control device body; and a screen mounted on the base member in engagement with the retainer surface, the radial sealing surface being radially spaced from the screen a sufficient distance such that compression of the radial sealing surface will not compress the screen.

4. The filtering seal of claim 3 wherein the screen has a cylindrical portion the inside diameter of which is engaged with the axial retainer surface.

5. In a fluid flow control device of the type having a body, a fluid flow path defined in the body including an inlet, an outlet, and a valve seat between the inlet and outlet, and a valve member selectably movable in and out of engagement with the valve seat, the improvement comprising a filtering seal disposable in the fluid flow path upstream of the valve seat, the filtering seal comprising:

a base member which defines an inlet in fluid communication with the flow path's inlet, an outlet in fluid communication with the valve seat, and an axis between the base member's inlet and outlet;

an axial first retainer surface formed on the base member;

a radial sealing surface formed on the base member and being engageable with the inlet of the control device body;

a plurality of legs attached to the base member and extending therefrom;

a screen support member attached to the legs and including an axial second retainer surface and a body sealing surface engageable with the control device body; and a screen mounted on the base member and the screen support member in engagement with the first and second retainer surfaces.

6. The filtering seal of claim 5 further comprising a plurality of locator members attached to the base member and engageable with the inlet of the control device body.

7. The filtering seal of claim 5 wherein the base member defines at its inlet a radial end face.

8. The filtering seal of claim 7 further comprising at least one boss protruding from the end face.

9. The filtering seal of claim 5 wherein the base member includes an axially-extending holder flange, with the first retainer surface being defined on said holder flange.

10. The filtering seal of claim 5 wherein the base member includes a radially-extending sealing flange, with the radial sealing surface being defined on said sealing flange.

11. The filtering seal of claim 10 wherein the sealing flange has an end face which is coplanar with the end face of the base member.

12. The filtering seal of claim 11 further comprising a first boss protruding from the end face of the base member and a second boss protruding from the end face of the sealing flange.

13. The filtering seal of claim 5 wherein the body sealing surface of the screen support member is arranged axially thereon.

14. The filtering seal of claim 5 wherein the screen support member further comprises a bead having a radial surface adjacent an end of the screen.

15. The filtering seal of claim 5 wherein the base member has an annular shape.

16. The filtering seal of claim 15 wherein the first and second retainer surfaces are formed on an outside diameter of the base member and the screen support member respectively.

17. The filtering seal of claim 16 wherein the screen is cylindrical and has its inside diameter in engagement with the first and second retainer surfaces.

* * * * *